United States Patent [19]
Lee et al.

[11] Patent Number: 5,822,293
[45] Date of Patent: Oct. 13, 1998

[54] MAGNETOOPTICAL RECORDING/REPRODUCING APPARATUS

[75] Inventors: Yong-jae Lee, Uiwang; Byeong-ho Park, Suwon, both of Rep. of Korea

[73] Assignee: Samsung Electronics Co., Ltd., Kyungki-Do, Rep. of Korea

[21] Appl. No.: 891,135

[22] Filed: Jul. 10, 1997

[30] Foreign Application Priority Data

Jul. 15, 1996 [KR] Rep. of Korea .................. 1996/28620

[51] Int. Cl.⁶ .................................................. G11B 7/00
[52] U.S. Cl. ........................................... 369/112; 369/103
[58] Field of Search .................................... 369/112, 103, 369/109, 110, 44.23

[56] References Cited

U.S. PATENT DOCUMENTS

| | | | |
|---|---|---|---|
| 5,416,765 | 5/1995 | Aikoh et al. | 369/112 |
| 5,648,950 | 7/1997 | Takeda et al. | 369/103 |
| 5,684,779 | 11/1997 | Ohuchida et al. | 369/112 |
| 5,737,296 | 4/1998 | Komma et al. | 369/103 |

FOREIGN PATENT DOCUMENTS 0 545 524 A1  6/1993  European Pat. Off. .......... G02B 5/32

*Primary Examiner*—Tod R. Swann
*Assistant Examiner*—Kim-Kluok Chu
*Attorney, Agent, or Firm*—Sughrue, Mion, Zinn, Macpeak & Seas, PLLC

[57] ABSTRACT

A magnetooptical recording/reproducing apparatus including a light source for emitting light, an object lens for condensing the light onto a magnetooptical disk, a polarization beam splitter in an optical path between the light source and the object lens, a first holographic device for diffracting an ordinary beam from the light passing through the polarization beam splitter after being reflected from the magnetooptical disk and allowing an extraordinary beam to pass therethrough unaltered, a second holographic device for splitting the ordinary and extraordinary beams passed through the first holographic device into a plurality of beams, and a photodetector for detecting the beams passing through the first and second holographic devices.

12 Claims, 8 Drawing Sheets

MAGNETOOPTICAL RECORDING/REPRODUCING APPARATUS

BACKGROUND OF THE INVENTION

1. Field of the Invention

The present invention relates to a magnetooptical recording/reproducing apparatus, and more particularly, to a magnetooptical recording/reproducing apparatus which records/reproduces information on/from a magnetooptical disk using a holographic element.

2. Background Art

In general, a magnetooptical recording/reproducing apparatus employed by a magnetooptical disk drive (MODD) records and/or reproduces information.

Referring to FIG. 1, a conventional magnetooptical recording/reproducing apparatus includes a light source 1 for emitting light and an object lens 3 for condensing the light emitted from the light source 1 to form a light spot on a magnetooptical disk 5. The object lens 3 is combined with an actuator 4 which is driven according to servo signals.

First and second polarization beam splitters 2 and 6 for determining the path of a proceeding incident light depending on a direction of the incident light are installed between the light source 1 and the object lens 3.

A collimator 16 for converting the light emitted from the light source 1 into a parallel beam is disposed on an optical path between the light source 1 and the first polarization beam splitter 2.

The light reflected by the second polarization beam splitter 6 is input to a first photodetector 9. The first photodetector 9 which is usually configured with a dichotomized photodiode detects light whose polarization plane is rotated by as much as the Kerr angle when reflected from the magnetooptical disk 5. The first photodetector 9 also detects data signals from a differential signal of the detected light.

A $\lambda/2$ retardation plate 7 for rotating the vibration direction of a linear polarized beam reflected from the magnetooptical disk 5 and a Walloston prism 8 for differentially splitting the signal light whose polarization plane is rotated by as much as the Kerr angle as reflected from the magnetooptical disk 5 are sequentially located on an optical path between the first photodetector 9 and the second polarization beam splitter 6.

The light passed through the second polarization beam splitter 6 proceeds toward the second photodetector 11. The second photodetector 11, sectioned into four photodiode areas (11a, 11b, 11c and 11d), as shown in FIG. 2, detects servo signals from the incident light.

A beam splitter 15 for splitting the incident light into three beams is located on an optical path between the second photodetector 11 and the second polarization beam splitter 6. The beam splitter 15, as shown in FIG. 2, includes a transparent flat glass substrate 19, a wedge prism 17 attached to a portion of the upper surface of the glass substrate 19, and a condensing lens 18 attached to the lower surface of the glass substrate 19.

The light 20 input to the beam splitter 15 falls upon a portion of the glass substrate 19 and each portion of inclined surfaces 17a and 17b of the wedge prism 17 and is split into first, second and third light beams 20a, 20b and 20c while passing through the glass substrate 19 and the condensing lens 18. The first, second and third light beams 20a, 20b and 20c are input to the second photodetector 11, and servo signals for focusing and tracking are generated based on the input light beams. An actuator 4 is driven by the servo signals so that the magnetooptical recording/reproducing apparatus can perform accurate tracking and focusing.

A monitor diode 10, for controlling an output of the light source 1 by measuring and feeding back the intensity of light emitted from the light source 1 and partially reflected by the first polarization beam splitter 2, is located beside the first polarization beam splitter 2.

In the operation of the magnetooptical recording/reproducing apparatus having the above structure, light emitted from the light source 1 passes through the first polarization beam splitter 2 and the object lens 3 and arrives at the magnetooptical disk 5. The polarization plane of the light is rotated by as much as the Kerr angle while the light is reflected from a recording surface of the magnetooptical disk 5. Then, the light passes through the object lens 3 again and is reflected by the first polarization beam splitter 2 to proceed toward the second polarization beam splitter 6. A portion of the light reflected by the second polarization beam splitter 6 passes through the $\lambda/2$ retardation plate 7 and the Walloston prism 8 and is input to the first photodetector 9 to be used as data signals. Also, the light which passes through the second polarization beam splitter 6 is input to the second photodetector 11 after passing the beam splitter 15 so as to be used for generating the servo signals.

In the conventional magnetooptical recording/reproducing apparatus, a plurality of elements such as the beam splitter, the $\lambda/2$ retardation plate, the Walloston prism and others are necessary. Thus, the assembly of the device becomes complicated and much time is required to adjust the elements for precise operation of the device.

SUMMARY OF THE INVENTION

To overcome the above problems, it is an objective of the present invention to provide a magnetooptical recording/reproducing apparatus having a simplified structure which can be easily assembled.

Accordingly, to achieve the above objective, there is provided a magnetooptical recording/reproducing apparatus including a light source for emitting light, an object lens for condensing the light onto a magnetooptical disk, optical path converting means (polarization beam splitter) disposed in an optical path between the light source and the object lens for determining the path of an input light, a first holographic device for diffracting an ordinary beam from the light passing through the optical path converting means after being reflected from the magnetooptical disk and allowing an extraordinary beam to pass therethrough unaltered, a second holographic device for splitting the ordinary and extraordinary beams passed through the first holographic device into a plurality of beams, and a photodetector for detecting the beams passing through the first and second holographic devices.

Preferably, a plurality of compensation grooves are formed parallel to each other in a surface of the first holographic device. Further, three patterns different from each other are formed in the second holographic device to split the ordinary and extraordinary beams from the first holographic device into three distinct beams, respectively.

BRIEF DESCRIPTION OF THE DRAWINGS

The above objective and advantages of the present invention will become more apparent by describing in detail a preferred embodiment thereof with reference to the attached drawings in which.

DETAILED DESCRIPTION OF THE INVENTION

Figure 1:
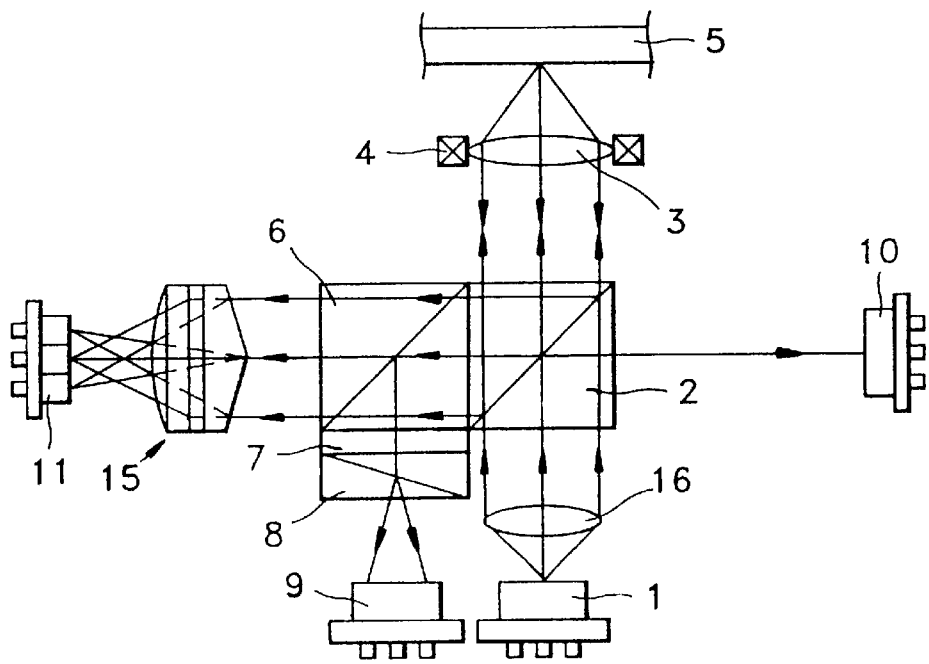
FIG. 1 is a view showing the optical configuration of a conventional magnetooptical recording/reproducing apparatus.
Figure 2:
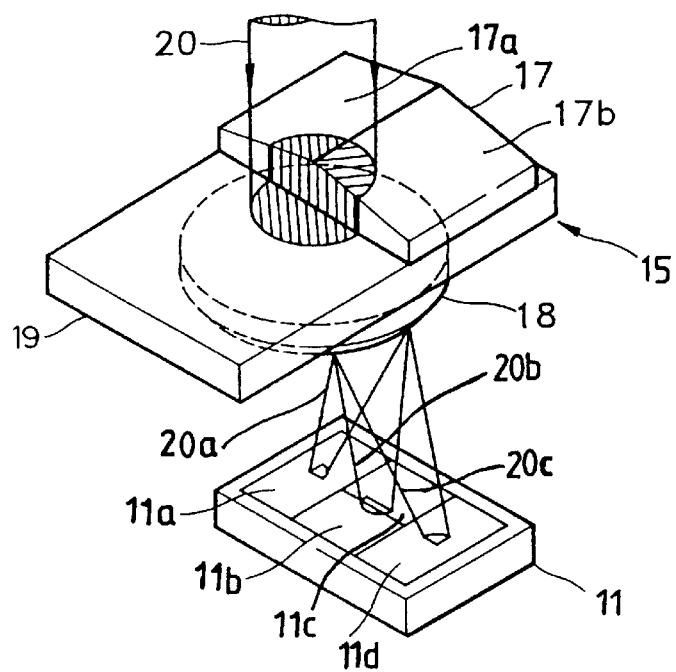
FIG. 2 is a perspective view illustrating the beam splitter and the photodetector shown in FIG. 1.
Figure 3:
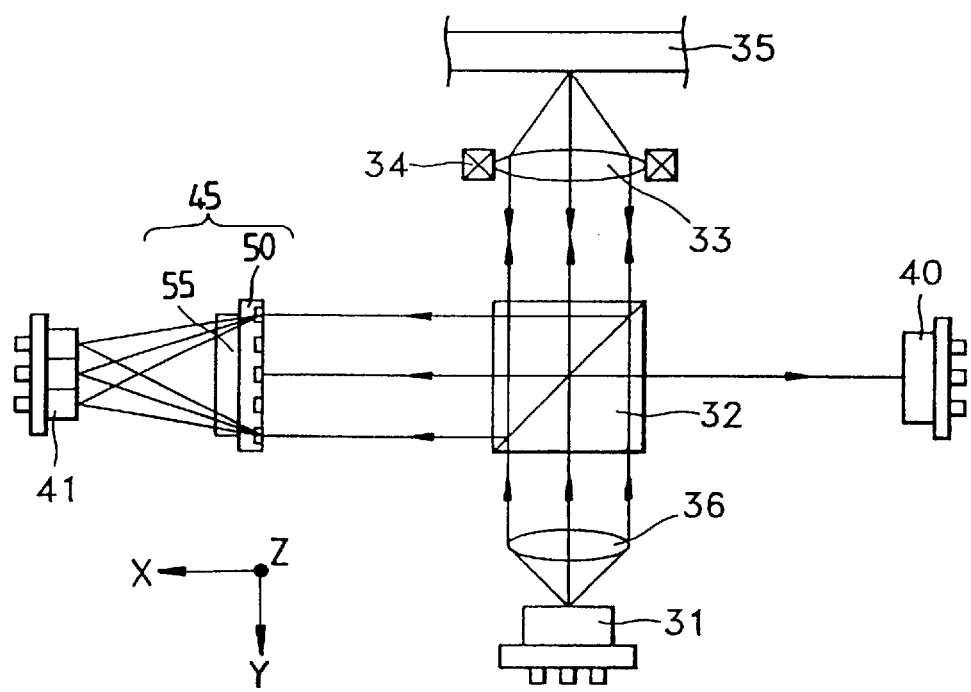
FIG. 3 is a view showing the optical configuration of a magnetooptical recording/reproducing apparatus according to an embodiment of the present invention.

Referring to FIG. 3, the magnetooptical recording/reproducing apparatus according to the present invention includes a light source 31, an object lens 33 for forming a light spot on a magnetooptical disk 35 by condensing light emitted from the light source 31, an actuator 34 for driving the object lens 33 according to servo signals, a polarization beam splitter 32 installed on an optical path between the light source 31 and the object lens 33 for determining the path of an input light, and a collimator 36 installed on an optical path between the light source 31 and the polarization beam splitter 32 for changing an input beam into a parallel beam.

Also, a photodetector 41, which is installed beside the polarization beam splitter 32, detects a data signal and servo signals such as tracking and focusing signals of the magnetooptical disk 35 by receiving light passing through the polarization beam splitter 32.

At the other side of the polarization beam splitter 32, a monitor diode 40 is disposed. The monitor diode 40 is for controlling the output of the light source 31 by measuring and feeding back the intensity of a portion of the light which is emitted from the light source 31 and partially reflected by the polarization beam splitter 32.

A holographic beam splitter 45 is disposed on an optical path between the polarization beam splitter 32 and the photodetector 41. This splitter 45 splits incident light to obtain a data signal and a servo signal. The holographic beam splitter 45 includes a first holographic device 50 and a second holographic device 55. It is preferable that the first and second holographic devices 50 and 55 are formed integrally.

Figure 4:
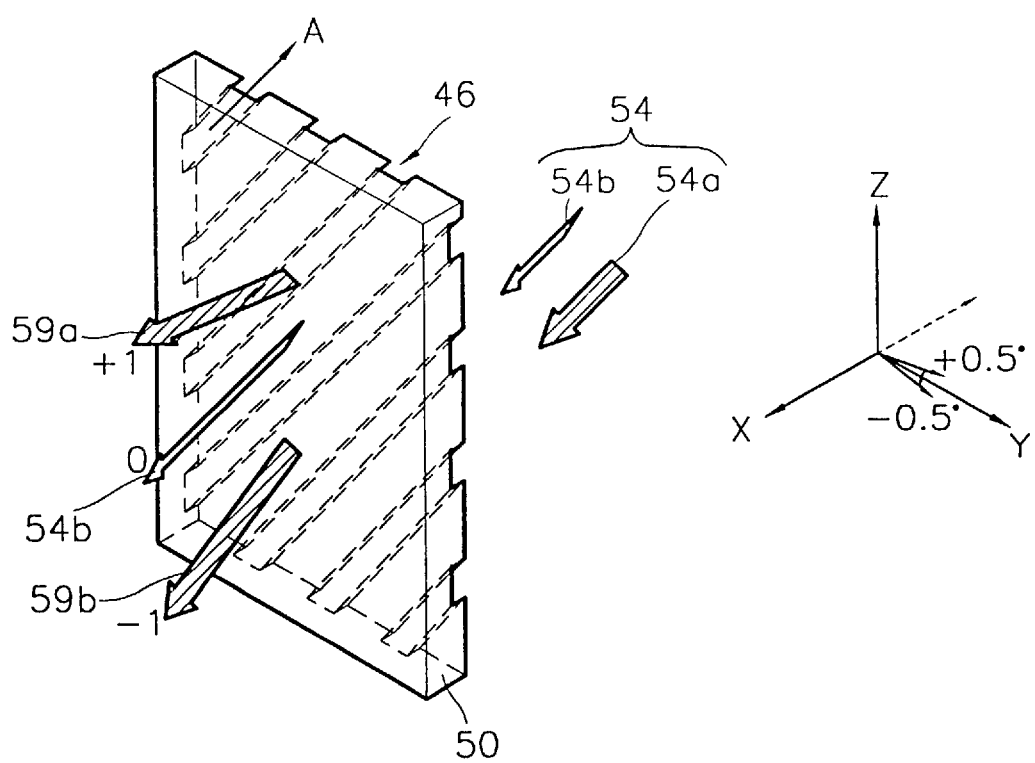
FIG. 4 is a perspective view illustrating the first holographic device of the holographic beam splitter shown in FIG. 3.

As shown in FIG. 4, the first holographic device 50 is a polarization holographic device in which a plurality of parallel compensation grooves 46 are formed on a surface thereof. An incident light 54 is input to the first holographic device 50 in a state in which the direction of a polarization plane is rotated by as much as the Kerr angle after being reflected from a data recording surface of the magnetooptical disk 35 (FIG. 3), and is composed of an ordinary beam 54a whose polarization direction is at 45° with respect to Y and Z axes, respectively, and an extraordinary beam 54b whose polarization direction is perpendicular to the polarization direction of the ordinary beam. The compensation grooves 46 diffract the ordinary beam 54a into a +1st order beam 59a and a −1st order beam 59b, and allow the extraordinary beam 54b to pass unaltered. Here, the direction (A) in which the compensation grooves 46 are formed is matched with a polarization direction of the extraordinary beam 54b in order to detect data recorded on the magnetooptical disk 35.

Figure 5:
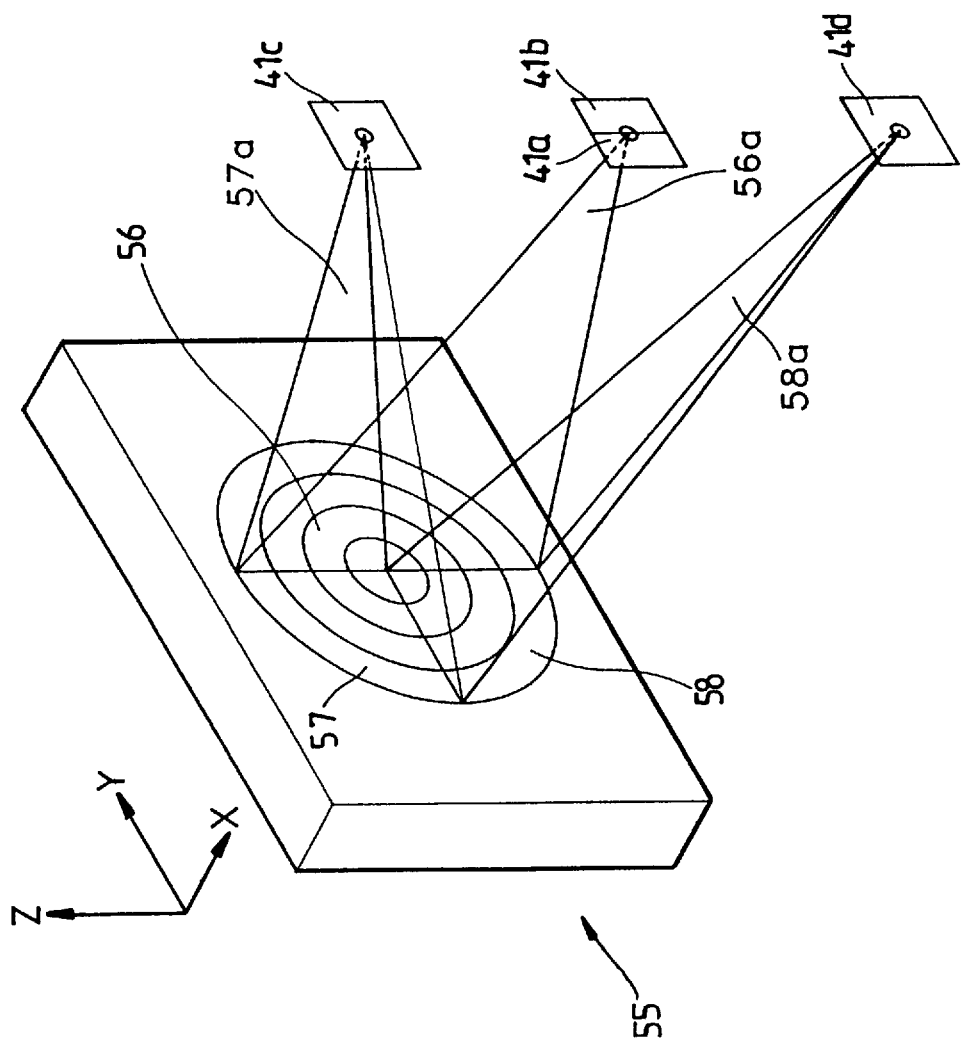
FIG. 5 is a perspective view illustrating the second holographic device of the holographic beam splitter shown in FIG. 3.

The second holographic device 55 (see FIG. 3) for splitting a beam including the servo signal from the incident light is classified into first, second and third areas 56, 57 and 58, as shown in FIG. 5. These areas are obtained by dichotomizing the second holographic device 55 along the Z-axis direction and then dichotomizing one of the dichotomized areas along the Y-axis direction. Since a different holographic pattern is formed in each of the first, second and third areas 56, 57 and 58, a beam passing through these areas is divided into first, second and third beams 56a, 57a and 58a.

Figure 6:
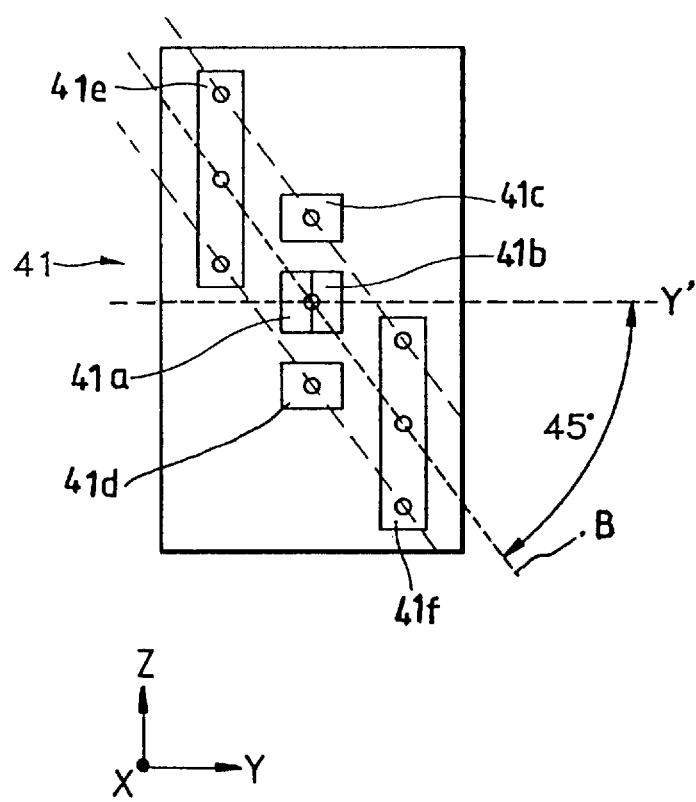
FIG. 6 is a front view of the photodetector shown in FIG. 3.
Figure 7:
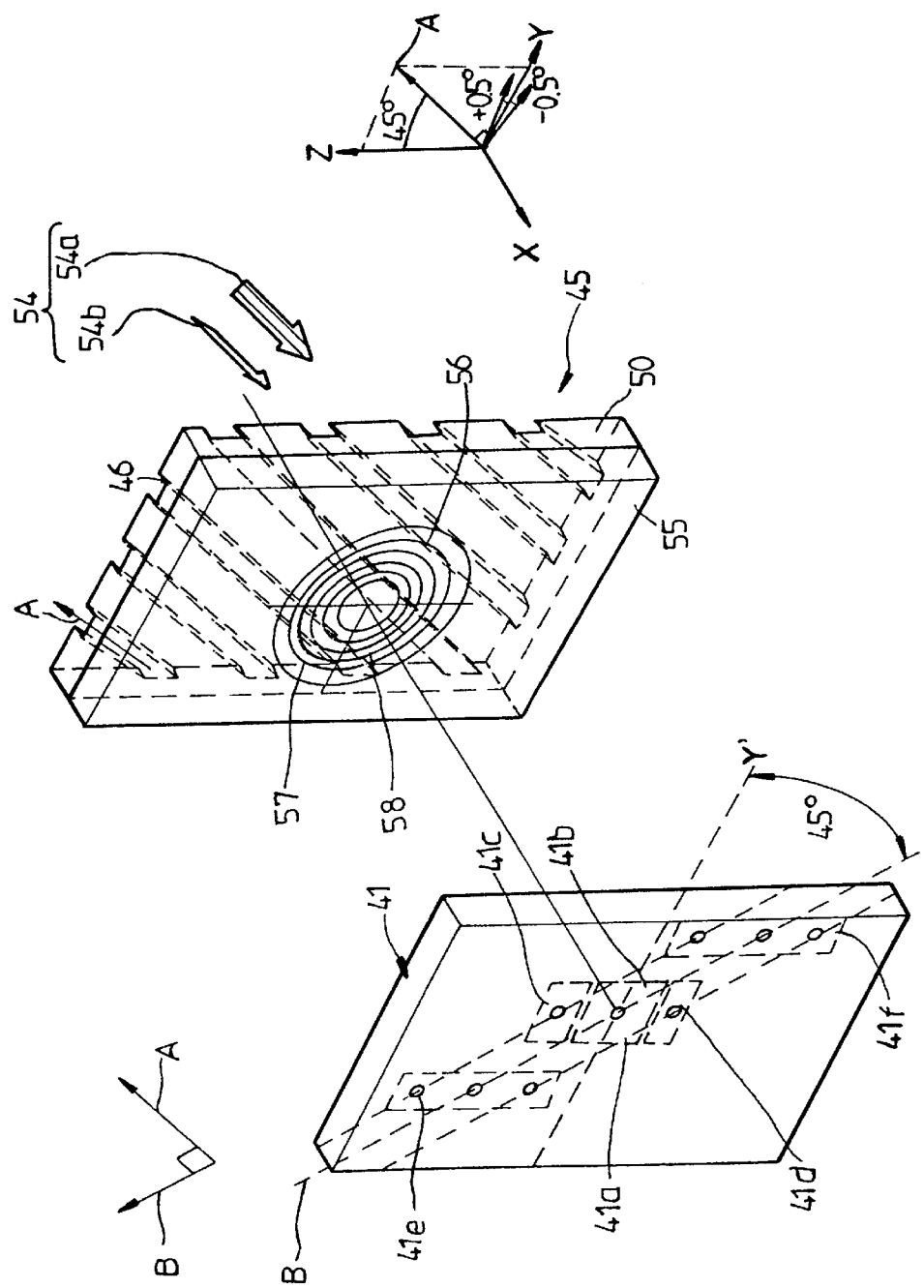
FIG. 7 is a perspective view illustrating the arrangement of the holographic beam splitter and the photodetector shown in FIG. 3.

As shown in FIG. 6, the photodetector 41 (see FIG. 3) is formed of a photodiode divided into six distinct areas. That is, the photodetector 41 includes first areas 41a and 41b for detecting a focus error signal, second areas 41c and 41d for detecting a track error signal, and third areas 41e and 41f for detecting the ordinary beam. At this time, the second and third areas 41c & 41d and 41e & 41f are arranged symmetrically with respect to the first areas 41a and 41b. It is preferable that an imaginary line (B) passing the center of the third areas 41e and 41f is rotated 45° with respect to an imaginary line Y' parallel to the Y-axis, as shown in FIG. 6. That is, as shown in FIG. 7, the imaginary line (B) is perpendicular to the direction (A) in which the compensation groove 46 of the first holographic device 50 is formed.

The operation of the magnetooptical recording/reproducing apparatus having the above structure will now be described.

Referring to FIG. 3, the light emitted from the light source 31 becomes a linearly polarized beam after passing through the collimator 36 and the polarization beam splitter 32, and the linear polarized beam is condensed on the magnetooptical disk 35 by the object lens 33. The condensed beam is reflected from the magnetooptical disk 35, and at this time, a polarization plane of the beam reflected from a data recording surface of the magnetooptical disk 35 is rotated within the Kerr angle, i.e, between ±0.5°. Magnetooptical signals of such data recorded on the magnetooptical disk 35 can be detected by measuring and amplifying a differential signal of the Kerr angle.

Figure 9A:
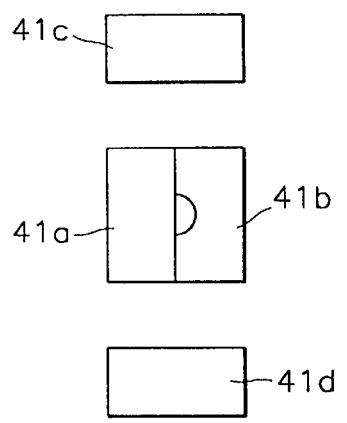
FIG. 9A is a front view showing the shape of a light spot focused on a first area of the photodetector shown in FIG. 7 in the case of a far-focus.
Figure 9B:
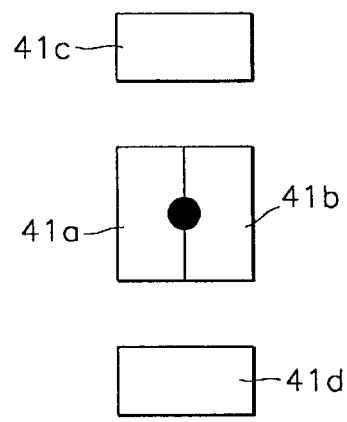
FIG. 9B is a front view showing the shape of a light spot focused on a first area of the photodetector shown in FIG. 7 in the case of an on-focus.
Figure 9C:
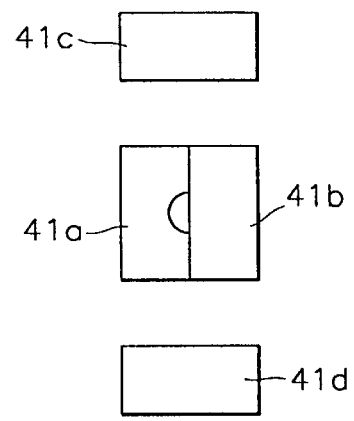
FIG. 9C is a front view showing the shape of a light spot focused on a first area of the photodetector shown in FIG. 7 in the case of a rear-focus.

The beam reflected from the magnetooptical disk 35 is reflected again by the polarization beam splitter 32 via the object lens 33, and then falls upon the photodetector 41 after passing through the holographic beam splitter 45. As shown in FIG. 7, the ordinary beam 54a of the light 54 input to the holographic beam splitter 45 is diffracted into ±1st order light 59a and 59b (see FIG. 4) by the compensation groove 46 of the first holographic device 50, and input to the third areas 41e and 41f of the photodetector 41. On the other hand, the extraordinary beam 54b which is not diffracted passes through the first holographic device 50, and as shown in FIG. 5, is split into first, second and third beams 56a, 57a and 58a after passing through the first, second and third areas 56, 57 and 58 of the second holographic device 55. The split beams 56a, 57a and 58a fall upon the first and second areas 41a & 41b and 41c & 41d, which are the servo areas of the photodetector 41, and the tracking and focus error signals are detected. Here, the focus error signal is detected by a well-known knife-edge method. FIGS. 9A, 9B and 9C show the shape of the beam received on the first areas 41a and 41b in the cases of a far-focus in which the distance between the magnetooptical disk 35 and the object lens 33 is longer than a focus length, an on-focus and a near-focus, respectively. Meanwhile, the tracking error signal is detected by a well-known push-pull method.

Figure 8:
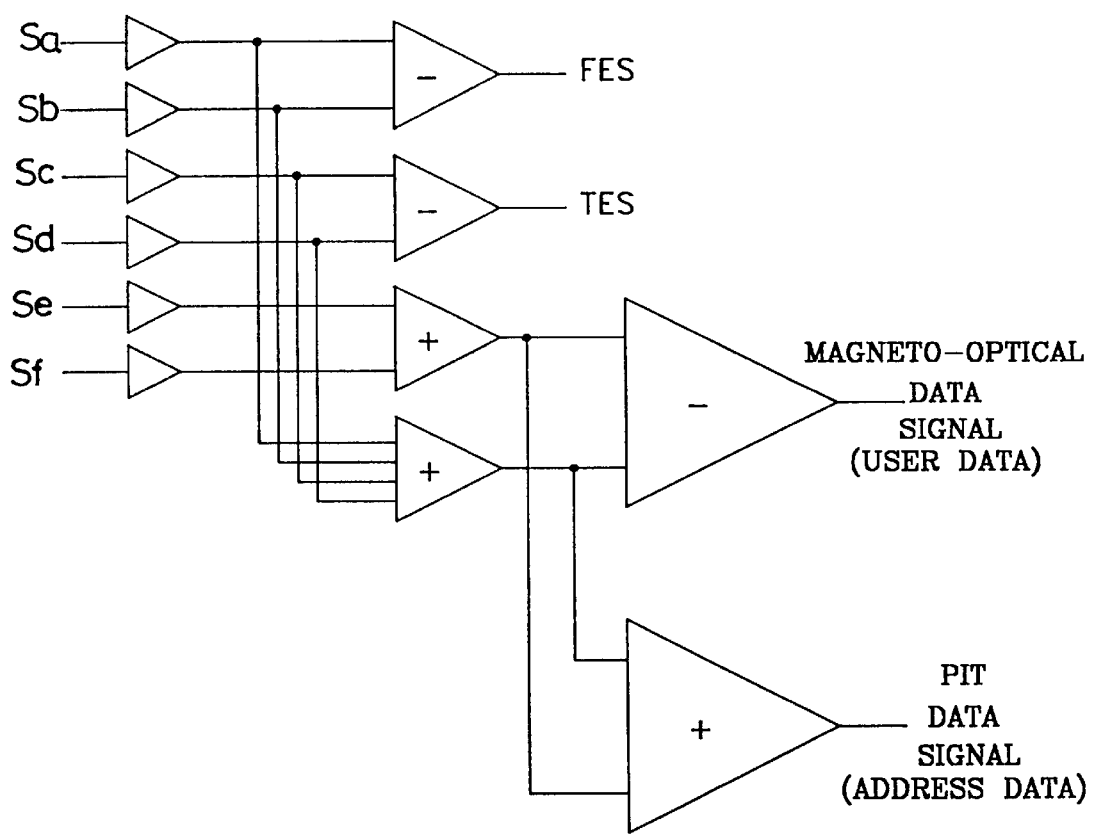
FIG. 8 is a circuit diagram showing the signal conversion circuit of the photodetector.

The beam received by the photodetector 41 is signal-processed by the signal conversion circuit shown in FIG. 8. Here, Sa through Sf represent optical signals for the areas 41a through 41f, respectively. The focus error signals are detected as Sa−Sb, the tracking error signals as Sc−Sd, the user data signal as (Sa+Sb+Sc+Sd)−(Se+Sf), and the address data signal as (Sa+Sb+Sc+Sd)+(Se+Sf).

As described above, in the magnetooptical recording/reproducing apparatus according to the present invention, the first and second holographic devices are integrated such that the first holographic device is used for the differential detection of the data signal and the second holographic device is used for the detection of the data and servo signal. Thus, the number of parts is reduced relative to the conventional apparatus so that assembly and adjustment thereof is simplified.

What is claimed is:

1. A magnetooptical recording/reproducing apparatus comprising:
   a light source;
   an object lens, said object lens condensing light from said light source onto a magnetooptical disk;
   a polarization beam splitter disposed in an optical path between said light source and said object lens, said polarization beam splitter receiving a light reflected by the magnetooptical disk and reflecting the light, the light reflected by said polarization beam splitter comprising an ordinary beam and an extraordinary beam;
   a first holographic device, said first holographic device diffracting the ordinary beam and allowing the extraordinary beam to pass therethrough unaltered;
   a second holographic device, said second holographic device splitting the ordinary and extraordinary beams from said first holographic device into a plurality of beams, respectively; and
   a photodetector, said photodetector detecting the plurality of beams.

2. A magnetooptical recording/reproducing apparatus as claimed in claim 1, wherein said first holographic device has a surface in which a plurality of compensation grooves are formed, said compensation grooves extending in parallel with each other.

3. A magnetooptical recording/reproducing apparatus as claimed in claim 2, wherein said compensation grooves extend in the same direction as a polarization direction of the extraordinary beam.

4. A magnetooptical recording/reproducing apparatus as claimed in claim 3, wherein said photodetector comprises first and second areas that receive the extraordinary beams from said second holographic device for determining a focus error and tracking error, and third areas that receive the ordinary beams from said second holographic device for reading data recorded on the magnetooptical disk, wherein an imaginary line connecting the centers of said third areas is perpendicular to the direction in which the compensation grooves extend.

5. A magnetooptical recording/reproducing apparatus as claimed in claim 1, wherein said first holographic device and said second holographic device are integrally formed.

6. A magnetooptical recording/reproducing apparatus as claimed in claim 1, wherein said photodetector comprises first and second areas that receive the extraordinary beams from said second holographic device for determining a focus error and a tracking error, and a third area that receives the ordinary beams from said second holographic device for reading data recorded on the magnetooptical disk.

7. A magnetooptical recording/reproducing apparatus as claimed in claim 1, wherein said second holographic device comprises three different holographic patterns, said holographic patterns splitting the ordinary and extraordinary beams into three separate beams, respectively.

8. A magnetooptical recording/reproducing apparatus as recited in claim 1, wherein the ordinary beam is polarized in a first direction, and the extraordinary beam is polarized in a second direction that is perpendicular to said first direction.

9. A magnetooptical recording/reproducing apparatus as recited in claim 1, further comprising a signal conversion circuit connected to said photodetector.

10. A magnetooptical recording/reproducing apparatus comprising:
    a light source;
    an object lens, said object lens condensing light from said light source onto a magnetooptical disk;
    a polarization beam splitter disposed in an optical path between said light source and said object lens, said polarization beam splitter receiving a light reflected by the magnetooptical disk and reflecting the light, the light reflected by said polarization beam splitter comprising at least two different types of light beams with different polarization directions;
    a first holographic device, said first holographic device diffracting a first type of light beam having a predetermined polarization direction and corresponding to data recorded on the magnetooptical disk into at least two light beams having different orders, and allowing another type of light beam having a polarization direction that is different from said predetermined polarization direction and corresponding to tracking and focus information, to pass therethrough unaltered;
    a second holographic device, said second holographic device splitting each light beam received from said first holographic device into at least three different light beams, respectively; and
    a photodetector, said photodetector detecting the light beams passing through said second holographic device.

11. A magnetooptical recording/reproducing apparatus as recited in claim 10, wherein said at least two light beams having different orders comprise positive and negative first order light beams.

12. A magnetooptical recording/reproducing apparatus as recited in claim 11, wherein said second holographic device splits said positive and negative first order light beams and said another type of light beam into a total of nine light beams, and said nine light beams are detected by said photodetector for determining tracking, error and data information from the magnetooptical disk.

* * * * *